March 6, 1951      J. A. TANNER      2,544,286
ELECTRIC MOTOR CONTROL SYSTEM

Filed Jan. 15, 1946      2 Sheets-Sheet 1

INVENTOR
JOSEPH ALAN TANNER,
BY Robert B Pearson
ATTORNEY

March 6, 1951  J. A. TANNER  2,544,286
ELECTRIC MOTOR CONTROL SYSTEM
Filed Jan. 15, 1946  2 Sheets-Sheet 2

INVENTOR
JOSEPH ALAN TANNER,
BY Robert B. Pearson
ATTORNEY

Patented Mar. 6, 1951

2,544,286

UNITED STATES PATENT OFFICE 2,544,286

ELECTRIC MOTOR CONTROL SYSTEM

Joseph Alan Tanner, Farnborough, England

Application January 15, 1946, Serial No. 641,327
In Great Britain January 15, 1945

3 Claims. (Cl. 318—28)

This invention relates to control systems and has for an object to provide improved electrical control apparatus for producing from an alternating current supply a reversible direct current output for actuating a power or servo unit, such apparatus being particularly applicable to servo actuated positional control systems, e. g. for rudders or control surfaces of aircraft, or to speed control of direct current motors, and in any case where a continuously variable, reversible direct current supply is required.

A further object of the invention is to provide servo control gear whereby "feel" indicative of torque or effort at the output of a servo control system shall be afforded at a manual actuating control and, if desired, whereby the system may be used as a manual system, e. g. in the event of power or servo unit failure. A still further object of the invention is to provide an electric servo control system for operation from an alternating current supply and which affords at a manually actuable control member of the system "feel" indicative of torque or effort at the output of the system. The invention as a whole is thus particularly applicable to servo actuation of the control surfaces of aircraft where it is required that the pilot shall "feel" the load at such surfaces and, further, that he should not lose control if the power supply or power unit should fail.

In electrical control apparatus, according to the invention, for producing from an alternating current supply a reversible direct current output for actuating a power or servo unit, a plurality of branch circuits each comprising a one-way-current device and a transformer secondary winding connected in series, is connected one circuit per phase in the one sense and one circuit per phase in the opposite sense across direct current output leads, and a control including two separate adjusting means for the oppositely connected branch circuits respectively, serves when actuated in either sense to adjust the branch circuit or circuits connected in the sense of control actuation alone to pass increasing current and so afford a direct current output.

It will be understood that for each phase of the alternating current supply there will be two branch circuits, each comprising a one-way-current device and a transformer secondary winding, connected in opposite senses respectively across the direct current output leads, the two separate adjusting means serving in the case of a multi-phase supply to adjust the two banks or groups of oppositely connected branch circuits, respectively. In general each branch circuit will have a single one-way-current device only and the direct current output will be in the form of half wave rectified alternating current. If desired, however, each branch circuit may be such, as by comprising four bridge-connected one-way-current devices or, alternatively, two such devices associated with a centre-tapped transformer secondary winding, as to provide a direct current output in the form of full wave rectified alternating current.

The two separate adjusting means may be operated simultaneously upon actuation of the control to adjust the oppositely connected branch circuits equally but oppositely, or alternatively only one of said separate adjusting means may be operated upon control actuation.

In general the adjustment of one or more branch circuits will be about or in relation to an initial adjustment or setting thereof, each branch circuit being such preferably as to have a critical adjustment beyond which in one sense it will pass increasing current and beyond which in the other sense it is substantially non-conductive, the initial setting or adjustment of each branch circuit being close to such critical adjustment thereof.

Preferably, the control includes actuating and follow up components for actuation manually or otherwise and in accordance with power or servo unit actuation by the apparatus, respectively, whereby branch circuit adjustment to afford direct current output is effected in accordance with relative displacement of such actuating and follow up control components, in which case initial adjustment or setting of the branch circuits may be effected by setting out of step or relatively displacing by a fixed amount actuating and follow up components of the control.

The intial adjustment or setting of the branch circuits may be such that they are non-conductive or, alternatively, such that they are conductive to a small extent. In the latter case, according as oppositely connected branch circuits are supplied at the corresponding transformer secondary windings in phase or in anti-phase so either a standing direct current will circulate therearound but there will be no standing output or there will be a standing alternating current output but no circulating standing current. A small standing alternating current output may be advantageous in avoiding sluggish starting due to "stiction" in a motor actuated by the apparatus.

Preferably, controlled thermionic or gas or vapour discharge one-way-current devices, such as thyratrons, are employed in the branch circuits, adjustment of said circuits being effected by the application of appropriate potentials to control electrodes thereof, and one or more impedances may be connected in the branch circuits and/or in the connection thereof to the direct current output leads. Initial setting for a small standing current is preferable in the case of thyratron or other one-way-current devices which are not substantially stable or constant as regards the critical adjustment thereof at which they "strike" or become conductive, for such setting ensures that despite such instability, a direct current output will be afforded without appreciable lag immediately the common control leaves its zero output adjustment.

For branch circuit adjustment with thyratron or other gas or vapour discharge one-way-current devices, potentials having direct current and alternating current or pulsating direct components are applied to the control electrodes of said devices, the alternating current or pulsating direct current component being out of phase with the alternating current supply applied to said devices by the transformer secondary windings in series therewith, and either or both of said components being variable to determine whether and for how much, or what proportion, of the duration of each effective supply half-cycle the control electrode potential reaches or exceeds the critical value at which a one-way-current device "strikes" or becomes conductive. Thus, for example, the control electrode potential may have an alternating current component which is constant and has a phase lag of 90 degrees in relation to the supply current, and a direct current component which is variable, or, alternatively, the direct current component may be constant and an alternating or pulsating direct current component may be of substantially constant amplitude and be variable in respect of its wave form.

The control may comprise one or more potentiometers or other direct current or alternating current variable "signal" producing devices and may include known or convenient phase discriminating and rectifier means and amplifiers with or without rate; and when the control includes one or more coupled element (e. g. telesyn or autosyn) type or other alternating current signal devices (e. g. one for actuation and another for follow up), said control may include phase discriminating means whereby the signal is fed simultaneously in opposite phase relationship to both the separate adjusting means, respectively, or to one or other only of said means at a time in accordance with the sense of control actuation, said adjusting means being designed to apply to the respective branch circuits corresponding adjusting or control potentials.

For compensating any lack of correspondence, due to applied load, between control actuation and consequential actuation of a power or servo unit by an apparatus according to the invention, there may be provided an additional control actuated automatically in accordance with change in loading conditions to effect corresponding branch circuit adjustment. Such compensating control may be actuated by means responsive to torque exerted by a power or servo unit actuated by the apparatus, or by means responsive to general loading conditions, for example, means responsive to speed, or to air speed and altitude, in the case of a dirigible object such as a ship or an aircraft. Further, such compensating control may be energised in accordance with actuating adjustment of the main control, or in accordance with displacement of a main control component, e. g. a follow up component, away from a predetermined, e. g. neutral or central setting or adjustment thereof, so that the compensating control will be ineffective except when the main control is actuated to afford direct current output or said main control component is displaced from said predetermined setting or adjustment.

Typical forms of the invention will now be described by way of example with reference to the accompanying diagrammatic drawings, of which:

Figure 2:
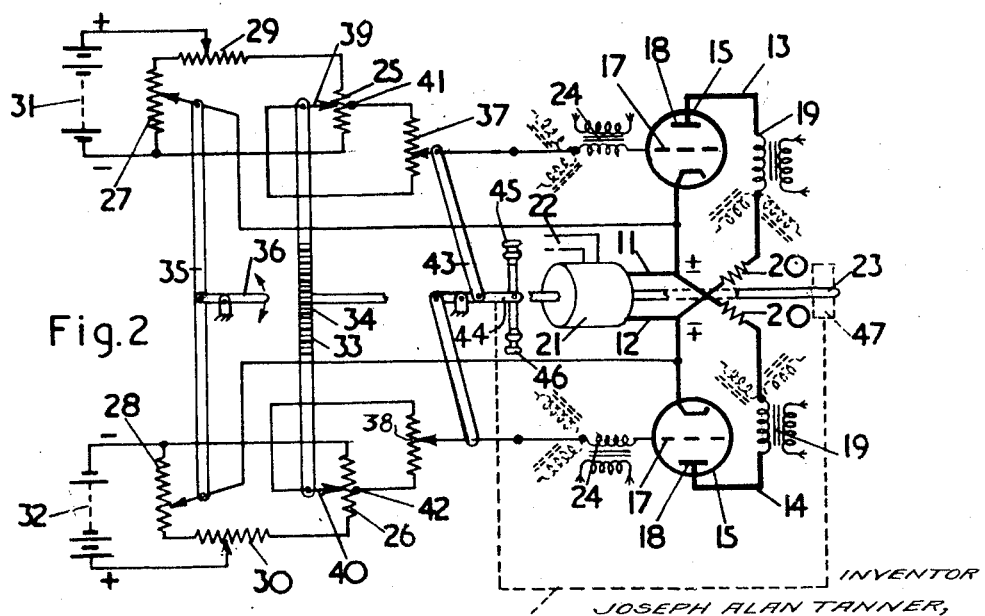
Figure 2 shows similarly the apparatus of Figure 1 modified by the addition of an automatic control for compensating lack of correspondence between control actuation and consequential power unit actuation due to applied load.
Figure 3:
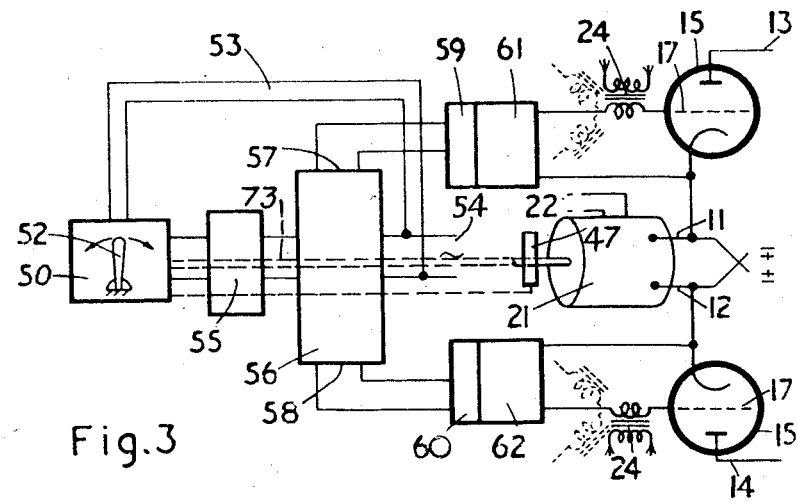
Figure 3 is a schematic diagram of an electrical control apparatus according to the invention employing an alternating current control.
Figure 4:
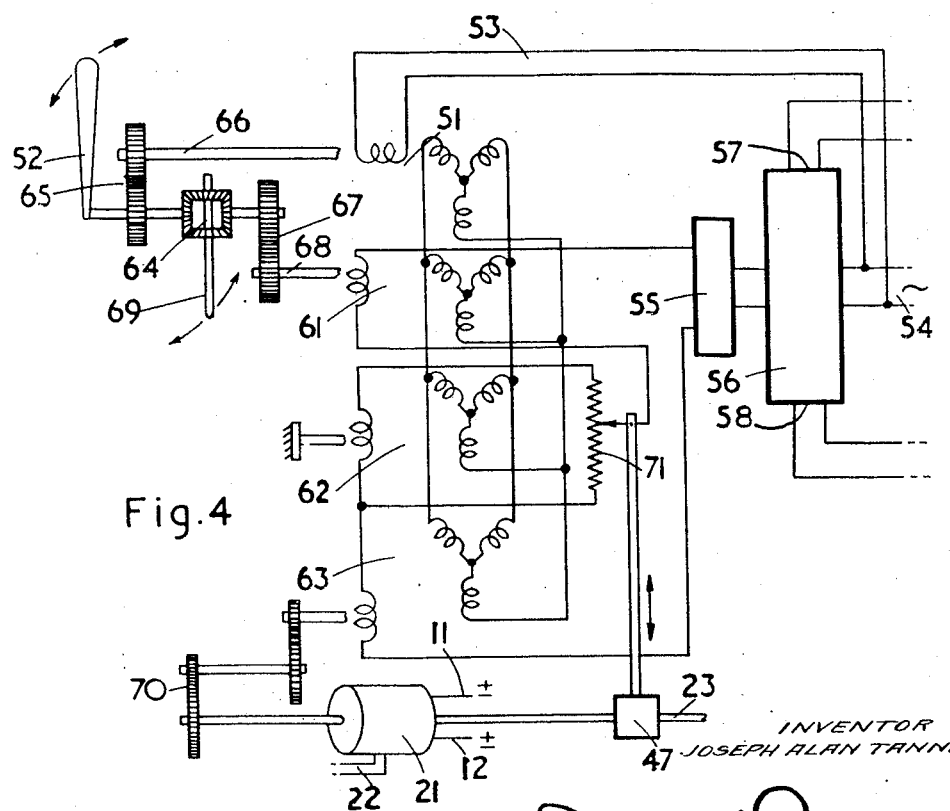

Figue 4 shows an arrangement for providing follow up, load compensating and trimming adjustments in an apparatus such as that of Figure 4; the branch circuits of the Figures 1 to 4 examples being adjusted by potentials having fixed alternating and variable direct current components.

Figure 1:
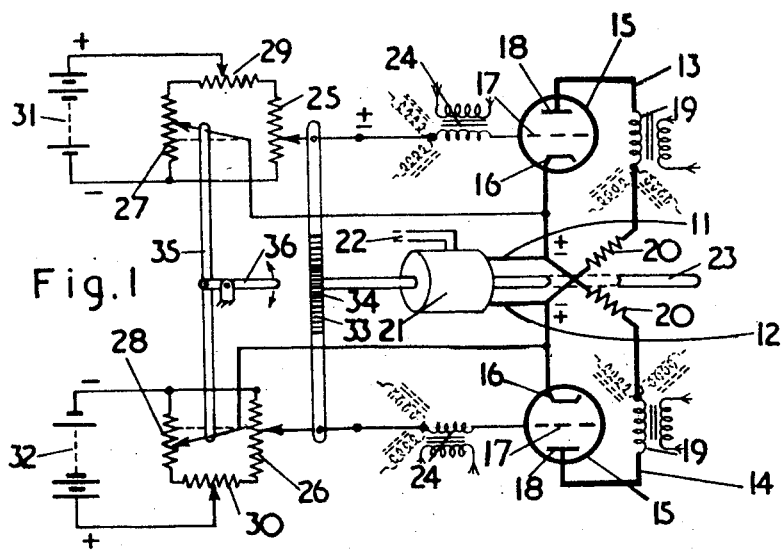
Figure 1 shows essential circuit and operating connections of a simple electrical control apparatus according to the invention employing a direct current control and including follow up.

Referring first to Figure 1 of the drawings, direct current output leads of the electrical control apparatus are indicated at 11 and 12, and two like branch circuits, indicated at 13 and 14, connected in opposite senses across said leads comprise each a controlled gas or vapour discharge type one-way-current device or thyratron 15, having a cathode 16, control grid 17 and anode 18, a transformer secondary winding 19, and a current limiting resistance or other impedance 20. A power or servo unit in the form of a direct current motor 21 has its armature (not shown) connected with the direct current output leads 11 and 12 and its field (not shown) connected via leads 22 to a constant source of direct current (not shown). One output shaft driven by the motor 21 is indicated at 23. Both secondary windings 19 are coupled with a common primary winding of a supply transformer and it will be understood that there will be two branch circuits like 13 and 14 for each phase of the supply, a single supply transformer serving all such circuits. Additional transformer windings for the three phase case are indicated in broken lines.

Included in the grid circuit of each thyratron is a grid transformer secondary winding 24, further such windings for the three phase case being indicated in broken lines, and all such windings are coupled to a common grid transformer primary winding.

The arrangement of the grid and supply transformer windings is such that the alternating current potential in the grid windings 24 lags 90 degrees in phase behind that in the supply windings 19.

The grid circuit of the branch circuit 13 is completed through a follow up potentiometer 25 and an actuating potentiometer 27 common to any further branch circuits connected in the same sense across the output leads 11 and 12, and constituting separate adjusting means therefor, whilst the grid circuit of the branch circuit 14 and those of any similarly connected branch circuits is or are completed via like separate adjusting means constituted by a follow up potentiometer 26 and an actuating potentiometer 28. The potentiometers 25 and 27 are connected in parallel via trimming potentiometer 29 across an independent source of direct current shown, for simplicity, as a battery 31 and the potentiometers 26 and 28 are connected similarly via a trimming potentiometer 30 with a separate direct current source 32. The follow up potentiometers 25 and 26 are adjusted equally but oppositely by the motor 21 as indicated by a rack and pinion connection 33, 34 therewith, and the actuating potentiometers 27 and 28 are adjustable also equally and oppositely by any convenient manual or other actuating control as indicated by a link 35 and hand lever 36.

The actuating potentiometers 27 and 28 are set initially, as shown, sufficiently in advance of the follow up potentiometers 25 and 26 to afford an initial direct current bias on the thyratron grids 17 about which the direct current component of the grid potential is caused to vary when the control 36 is actuated, and this initial bias is such that all the thyratrons 15 are struck for a small part of each effective supply half cycles so that the motor 21 will receive armature current immediately the control 36 is actuated. The arrangement may be such that the supply to the branch circuit or circuits 13 is in phase with the supply to the circuit or circuits 14 in which case there will be a small standing current, limited by the resistances or other impedances 20 (each of which may be common to a group of branch circuits 13 or 14), circulating around the local closed circuit comprised by said branch circuits 13 and 14 but no output at leads 11 and 12, or the supplies to the branch circuits 13 and 14 may be in antiphase in which case there will be no circulating current but, instead, a small standing alternating current output at the leads 11 and 12 and hence a standing alternating current in the armature of the motor 21 which will be advantageous in overcoming any "stiction" and consequent sluggish starting.

If desired, however, the initial direct current grid bias may be such that there is no standing current or output but that either the thyratron or thyratrons of circuit or circuits 13 or that or those of circuit or circuits 14 will strike substantially immediately the control 36 is actuated.

In this form of electrical control apparatus the oppositely connected branch circuits are adjusted equally and oppositely by control actuation, thyratrons of whichever branch circuits are affording direct current output being struck earlier in each effective supply half cycle as the control 36 is actuated to a greater extent.

Under small or no load conditions on the servo system, the follow up potentiometers 25, 26 and a member driven by the output shaft 23, e. g. an aircraft control surface, will come to rest when the displacement between the follow up potentiometers 25, 26 and the actuating potentiometers 27 and 28 is equal to the initial or bias displacement, irrespective of whether the control 36 is central or otherwise. Depending on load conditions, however, which may vary absolutely and/or with position of the driven member, the driven member will come to rest when the follow up potentiometers 25 and 26 have reached positions affording an output current just sufficient to balance the load, and there will then be a lack of correspondence or a positional error as between driven member and control adjustments when the loading on the servo system is correspondingly heavy. With a view to meeting this drawback a further control may be provided for automatically adjusting the branch circuits in accordance with the servo system load conditions, when the main control is actuated, either in accordance with torque exerted by the motor 21 or in accordance with other factors producing load conditions irrespective of driven member position, e. g. where the driven member is an aircraft control surface, in accordance with air speed and altitude. It should be apparent that differences in altitude or air speed will produce differences in loading of an aircraft control surface which may result in increased loading of a servo system connected to the control surfaces.

The electrical control apparatus of Figure 2 is the same as that of Figure 1 except that it includes provision for such additional automatic compensating control adapted to suit the case where the driven member, e. g. an aircraft control surface such as a rudder, has a central or neutral position at which applied load is zero. In this case compensating adjustment is required only when the desired position of adjustment of the driven member is other than the central position and the compensating adjustment will require to vary with the extent of driven member adjustment away from centre and with external loading conditions, e. g. air speed and altitude. The additional adjusting means comprise potentiometers 37 and 38 for the oppositely connected branch circuits 13 and 14, respectively, which are connected, for energisation in accordance with follow-up potentiometer (and therefore of driven member) adjustment away from centre, between the moving contacts 39, 40 and fixed tappings 41, 42 of the follow up potentiometers 25 and 26 which are coincident with the centre or mid-positions of said moving contacts 39, 40. The compensating potentiometers 37 and 38 are thus connected in series in the respective separate adjusting circuits, and are effective only when the follow up potentiometers 25 and 26 are displaced from centre. They are adjusted automatically in the same sense as indicated by a link and lever system 43, 44 connected to the load responsive means. In the case of an aircraft control surface the lever 44 may be actuated automatically in response to conditions producing loading of the control surface and servo system by bellows 45 and 46 one of which is evacuated to respond to altitude change and the other of which is connected to the dynamic side of a Pitot head governed by air speed and altitude.

Alternatively the lever 44 may, however, be actuated in any known or convenient manner in accordance with conditions affecting the loading of the servo system, for example, by means responsive to torque exerted at the output shaft, as indicated in broken lines at 47, 48.

Turning now to Figure 3 of the drawings, branch circuits 13 and 14 oppositely connected across direct current output leads 11 and 12 to a direct current motor 21 constantly excited via leads 22 are the same as described above in respect of the electrical control apparatus of Figure 1 and have the same grid transformer secondary windings 24 furnishing a constant alternating current component of the control electrode potential. In this case, however, the variable direct current control electrode potential is derived from an alternating current signal by aid of phase discriminating and rectifying means with or without interposed amplifiers. Follow up, actuating and compensating alternating current signal components are produced by a signal assembly indicated at 50, a manual or actuating control for this assembly is indicated as a hand lever 52, a follow-up connection thereto at 73, a compensating connection at 47, and leads connecting it for constant excitation or energisation with a source 54 of alternating current, at 53. The output of this signal device 51 is connected via a single stage alternating current amplifier 55 (which in some cases may be omitted) to a unit 56 comprising phase discriminating and rectifier means supplied with alternating current as a reference from the same source 54 as the signal device 51, and having two direct current outputs indicated at 57 and 58, constituting the separate adjusting means for the branch circuits. The phase discriminator and rectifier means of the unit 56 are of known or convenient type and may be such as afford a direct current voltage at one only of the two outputs 57 and 58 at a time, according to the sense in which the control lever 52 is actuated from a neutral, no signal, position; or, alternatively, the discriminator and rectifier means of the unit 56 may be such as to afford equal direct current voltages of opposite polarity at the outputs 57 and 58 according to the actuation of the control 52. The outputs 57 and 58 of the unit 56 are connected via rate and/or integral circuits indicated at 59, 60 and via single stage amplifiers 61, 62 with the grid cathode circuits of the thyratrons 15 of the oppositely connected branch circuits 13 and 14, respectively. The outputs of the amplifiers 61, 62 (or in some cases where said amplifiers 61 and 62 are omitted, the outputs 57 and 58 of the unit 56), are such as to afford a direct current potential varying from a negative value through zero to a positive value at the control electrodes 17 of the thyratron control electrodes 17.

It will be seen that in an electrical control apparatus according to Figure 3 of the drawings and depending upon the type of discriminating means employed in the unit 56 the branch circuits 13 and 14 may be adjusted simultaneously and equally and oppositely as in the case of Figure 1, or, alternatively, either of said circuits 13 and 14 may be adjusted alone at a time, according to the sense in which the control 52 is actuated.

Provision for follow up and/or for compensating any lack, due to loading conditions, of correspondence between control actuation and consequential power or servo unit actuation is shown in Figure 4. Except that additional alternating current signal devices are employed the Figure 4 example is the same as that of Figure 3 which latter figure is only reproduced there in part (i. e. as regards the optional alternating current amplifier 55 and the phase discriminator rectifier unit 56). As shown in Figure 4, four like alternating current signal producing devices are employed, each having a single phase rotor winding coupled inductively to a three section stator winding, namely, an actuating signal device 51, a trim signal device 61, a compensator signal device 62 and a follow up signal device 63.

The rotor winding of the actuating device 51 is connected, as a primary for constant excitation, with the alternating current source 54 supplying the reference phase to the discriminator unit 56 and all four stator windings are connected together so that the stator fields in devices 61, 62 and 63 are rotated in the same sense as the device 51 is actuated, the normal state being as shown, when owing to the positions of the four rotors there is no signal. The rotors of the actuating and trim signal devices 51 and 61 are connected for movement normally as one with one another through mechanism (e. g. including differential or epicyclic gear) whereby the trim rotor may be adjusted in relation to the actuating rotor even while the latter is being actuated, as is required as in the case of an aircraft control surface actuating system. Such connection is indicated in the drawing by a differential gear 64 one main bevel wheel of which is connected through 1:1 spur gears 65 to the shaft indicated at 66 of the actuating rotor and has connected fast thereto an actuating control lever 52, e. g. the flying control column of an aircraft. The other main bevel wheel is connected through 1:1 spur gears 67 with the rotor shaft, indicated at 68 of the trim signal device 61, and the planet carrier of the differential gear 64 carries a trim control lever 69 which is held frictionally or otherwise (by means not shown) against undesired or unintentional adjustment. It will be seen that a voltage will be induced in the rotor of the trim signal device 61 only in accordance with the displacement of said rotor in relation to that of the actuating signal device 51 regardless of the position of the control lever 52. The rotor of the compensating signal device 62 is fixed so that voltage is induced therein in accordance with displacement of the rotor of the actuating signal device 51. The rotor of the follow up signal device 63 is connected, as indicated by spur gearing 70, to a direct current motor 21 actuated by the apparatus. A compensator potentiometer 71 is connected across the compensator rotor to be energised thereby and is actuated from device 47, such as a torque meter, in accordance with torque exerted by the motor 21, to pick off a corresponding proportion of any voltage induced in the compensator rotor.

The output of the potentiometer 71, and rotors of trim and follow up signal devices 61 and 63 are connected in series and, as shown, across the input of the alternating current amplifier 55 (or, where said amplifier 55 is omitted, across the input of the discriminator rectifier unit 55).

It will be seen that a control signal will be produced in accordance with relative displacement of actuating and follow up rotors, such signal being increased or decreased by any trim signal due to relative displacement of actuating and trim rotors effected by the trim control 69, and such signal being increased by any adjustment of the compensator potentiometer 71 due to torque at the shaft 23.

It will be apparent that, according to the use to which the apparatus is to be put, any of the trim signal device 61, the compensator signal device 62 together with the compensator potentiometer 71, and the follow up signal device 63, may be omitted, those remaining having their outputs connected in series across the input of the alternating current amplifier 55 (or that of the unit 56 in cases where said amplifier 55 is not required). In some cases, e. g. where there is no positional follow up, the rotor of one series connected signal device may be adjusted automatically in accordance with the speed and direction of rotation of a direct current motor actuated by an apparatus according to the invention, e. g. in accordance with the output of a generator driven by said motor.

In the Figures 1, 2, 3 and 4 examples of electrical control apparatus according to the invention the alternating current component of control electrode potential is maintained constant with a 90 degree phase lag in relation to anode potential and the direct current component varied for adjustment of branch circuits, but it will be clear that there are many ways in which provision can be made in an apparatus according to the invention for varying the alternating current component for branch circuit adjustment whilst maintaining the direct current component of the control potential constant.

Where amplifiers are used in electrical control apparatus according to the invention they may be of any known or convenient electronic or magnetic type, it being preferable in the interests of stability to use two single stage amplifiers, e. g. as indicated at 55 and 61, 62 of Figure 3, rather than a single multistage amplifier. In some cases where thyratron or other electronic, or gas or vapour discharge, one-way-current devices are employed these may have more than a single control grid, potentials for different adjustments or settings being applied to different control electrodes, for example, in the case of a tetrode, main control adjusting potentials may be applied to the inner grid and compensating potentials to the outer grid, instead of being added to the main control potentials and applied to the same grid as in the case of Figure 2.

Impedances, such as those indicated at 20, Figure 1, may be connected in each branch circuit and/or in a common connection to one output lead of a number of branch circuits connected in the same sense across the direct current output leads of the apparatus.

I claim:

1. Electrical control apparatus, for connection to an alternating current source to supply variable and reversible direct current to a direct current motor, comprising transformer supply means, at least two adjustable branch circuits comprising each a secondary winding of said transformer supply means and a one-way-current device connected in series, said circuits being connected oppositely in parallel with one another across the motor supply leads, means operable in response to loading conditions for adjusting the two branch circuits to cause one of said circuits at a time to pass increased current, a control arrangement including actuating control means, follow-up control means, and compensating control means connected for operation by said means operable in response to loading conditions, and means for energising the compensating control means in accordance with displacement of the follow-up control means away from a predetermined, e. g., neutral, adjustment thereof in such manner that the compensating control means are operative only when the follow-up control means are displaced from said predetermined position.

2. Electrical control apparatus, for connection to an alternating current source to supply variable and reversible direct current to a direct current motor, comprising transformer supply means, at least two adjustable branch circuits comprising each a secondary winding of said transformer supply means and a one-way-current device connected in series, said circuits being connected oppositely in parallel with one another across the motor supply leads, means operable in response to torque exerted by the direct current motor for adjusting the two branch circuits to cause one of said circuits at a time to pass increased current, a control arrangement including actuating control means, follow-up control means, and compensating control means connected for operation by said means operable in response to torque exerted by the direct current motor, and means for energising the compensating control means in accordance with displacement of the follow-up control means away from a predetermined, e. g. neutral, adjustment thereof, in such manner that the compensating control means are operable only when the follow-up control means are displaced from said predetermined position.

3. Electrical control apparatus, for connection to an alternating current source to supply variable and reversible direct current to a direct current motor, comprising transformer supply means, at least two adjustable branch circuits comprising each a secondary winding of said transformer supply means and a one-way-current device connected in series, said circuits being connected oppositely in parallel with one another across the motor supply leads, means operable in response to speed of the direct current motor for adjusting the two branch circuits to cause one circuit at a time to pass increased current, a control arrangement including actuating control means, follow-up control means, and compensating control means connected for operation by said means operable in response to speed of the direct current motor, and means for energising the compensating control means in accordance with displacement of the follow-up control means away from a predetermined, e. g. neutral, adjustment thereof in such manner that said compensating control means are operable only when the follow-up control means are displaced from said predetermined position.

JOSEPH ALAN TANNER.

REFERENCES CITED

The following references are of record in the file of this patent:

UNITED STATES PATENTS

| Number | Name | Date |
|---|---|---|
| 2,113,971 | Winograd | Apr. 12, 1938 |
| 2,147,674 | Satterlee | Feb. 21, 1939 |
| 2,152,144 | Minelli | Mar. 28, 1939 |
| 2,217,399 | Edwards | Oct. 8, 1940 |
| 2,232,982 | Tank | Feb. 25, 1941 |
| 2,275,317 | Ryder | Mar. 3, 1942 |
| 2,330,569 | Esnault-Pelterie | Sept. 28, 1943 |
| 2,408,813 | Riggs | Oct. 8, 1946 |
| 2,411,139 | Roy et al. | Nov. 12, 1946 |
| 2,415,429 | Kellogg et al. | Feb. 11, 1947 |
| 2,423,228 | Conklin | July 1, 1947 |
| 2,432,036 | Noxon | Dec. 2, 1947 |
| 2,471,637 | MacCallum | May 31, 1949 |